March 17, 1964
G. P. WALKER
3,125,137
METHOD AND APPARATUS FOR FABRICATING
INSULATION SECTIONS FOR TUBE TURNS
Filed Dec. 31, 1958
2 Sheets-Sheet 1
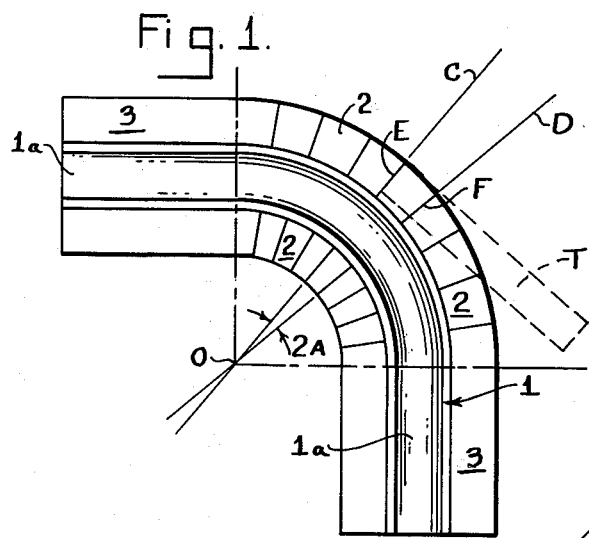
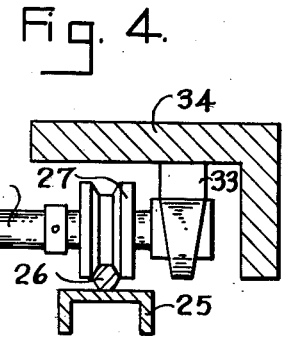
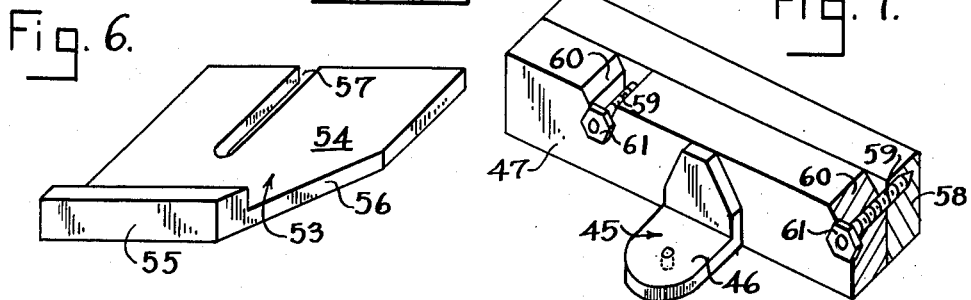
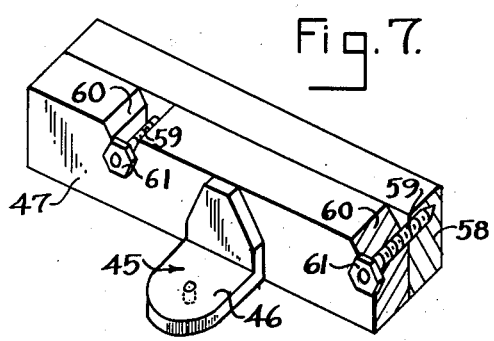
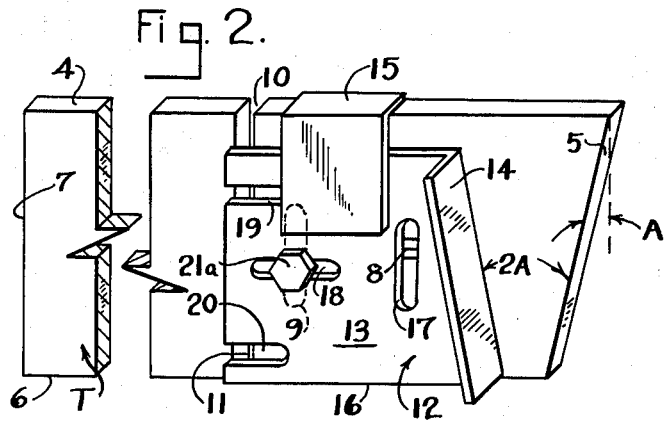
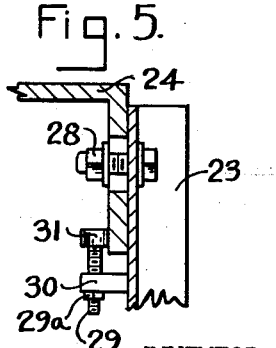
INVENTOR.
GEORGE P. WALKER
BY
John A. McKinney
ATTORNEY March 17, 1964
G. P. WALKER
3,125,137
METHOD AND APPARATUS FOR FABRICATING
INSULATION SECTIONS FOR TUBE TURNS
Filed Dec. 31, 1958
2 Sheets-Sheet 2
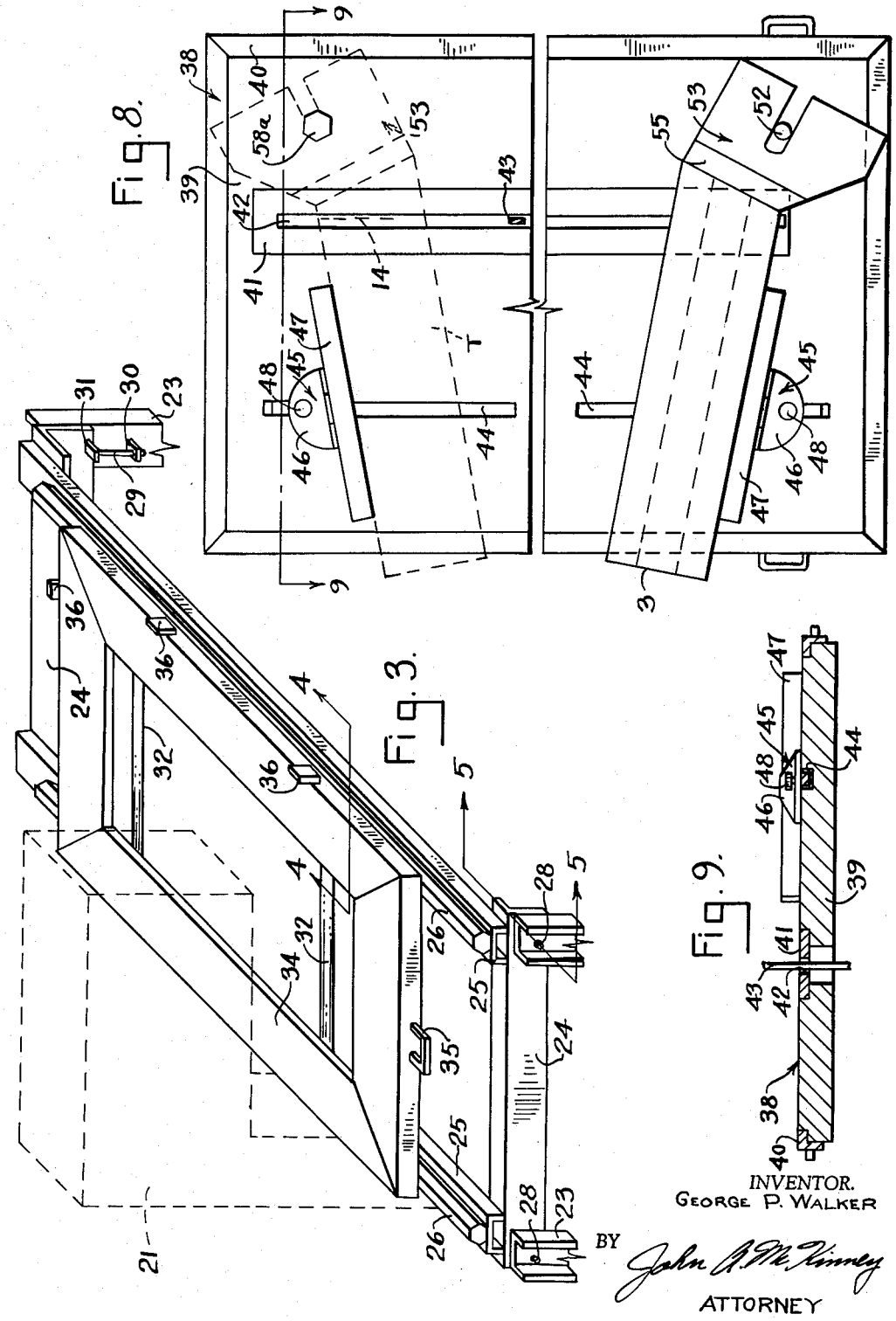
INVENTOR.
GEORGE P. WALKER
BY
ATTORNEY

United States Patent Office 3,125,137
Patented Mar. 17, 1964

3,125,137
METHOD AND APPARATUS FOR FABRICATING INSULATION SECTIONS FOR TUBE TURNS
George P. Walker, Westport, Conn., assignor to Johns-Manville Corporation, New York, N.Y., a corporation of New York
Filed Dec. 31, 1958, Ser. No. 784,253
9 Claims. (Cl. 143—25)

This invention relates to the insulation of pipe systems; more specifically it relates to insulating tube turns or pipe turns in such piping systems.

In piping systems, wherein the exterior of the pipes must be insulated according to the nature of the medium being conducted by the pipes, the straight run pipes are commonly insulated merely by placing thereover a pair of mated, hollow, semi-cylindrical insulation sections, which are subsequently secured in place. In coming to a pipe turn or any other change in direction of the straight run pipe, the semi-cylindrical sections cannot be used, without being modified extensively, to insulate these turns, as there is usually not a sufficient degree of flexibility to the insulation sections. Consequently, a make-shift arrangement is usually resorted to, wherein a certain amount of rough cutting of the sections is made, and the tube turn is fitted with these cut sections. The numerous gaps or irregularly mated areas created must be troweled with cement to finish the insulation on the turn and to present a neat arrangement.

An object of this invention, therefore, is a method and apparatus for producing accurate sections to be used in covering a pipe system in a tube turn or in any change of direction of the straight run pipes whereby such sections can be assembled to cover the turn and to be combined with the straight run insulation sections to form a tightly sealed and neat appearing insulation covering.

A further object of this invention is to provide a method and apparatus capable of mass producing accurate insulation sections to be used around tube turns, and which sections require practically no hand fitting or compensation to provide tightly sealed insulation housings on such turns.

An additional object of this invention is a method and apparatus for precutting insulation sections to house tube turns, and the like, such that the insulation sections may be precut for all the tube turns in a particular installation once the various sizes of tube or pipe and the total number of degrees of turn for each particular pipe or tube size are known.

Still a further object of this invention is to provide a method and apparatus for providing insulation coverings for a tremendous variety of sizes of pipes and which are adaptable for use with an extensive variety of insulation sizes to be used on such pipes.

In brief, the invention comprises a series of templates or jigs to be used in setting up a modified conventional band saw, which series allows the band saw to be used in cutting semi-cylindrical insulation sections in a manner to produce a plurality of accurately cut, similar insulation sections to be placed around tube turns in a piping system. Each template conforms to a certain size of pipe and a maximum size or thickness of insulation for such pipe, such that when the band saw is set up with the use of the templates, all maximum sizes of insulation sections to be used with the various diameters of pipe can be cut thereon. A plurality of compensating blocks may also be used, in conjunction with each template, so that various thicknesses of insulation sections for a pipe of specific diameter may also be similarly cut.

These and other objects will be readily apparent from the preceding description and the following, more detailed description and attached drawings wherein:

FIG. 1 is a schematic layout of a tube turn showing the insulation sections used around a turn;
FIG. 2 is a pictorial view of one of the templates used in aligning the band saw attachments;
FIG. 3 is a pictorial view of the band saw table carriage and its means of support;
FIG. 4 is a cross-sectional view along lines 4—4 of FIG. 3;
FIG. 5 is a cross-sectional view along lines 5—5 of FIG. 3, showing a detail of the carriage support;
FIG. 6 is a pictorial view of the limit stop for the jig of the band saw;
FIG. 7 is a pictorial view, partially in cross-section, of a compensating block joined to a positioning block;
FIG. 8 is a plan view of the table of the band saw; and,
FIG. 9 is a cross-sectional view of the table along lines 9—9 of FIG. 8.

In conventional practices for insulating a pipe system (FIG. 1) the straight run of pipe 1a is encircled by a pair of mated, hollow, semi-cyclindrical insulation sections 3 which are secured together to form a tight insulator around the pipe. The straight run of pipe is completely housed by placing such mated sections end to end until an obstruction or a change in the system occurs, whereafter, the problems of insulation are increased. Such a change, for example, is a 90° turn, a loop, a complete circle, or a cross-over. Such changes in angular direction are known as "tube turns" regardless of whether the basic straight run sections are classified as "pipes" or "tubes." In some installations, the turn is accomplished through the use of an intermediate angular coupling, while in other installations, standard similar pipe sections, having the proper angular turn, are secured, as by welding, to the standard straight run sections. The primary difference between the angular couplings and the angular pipe sections is that the angular pipe sections are of the same external diameter and cross-section as the adjacent straight run sections, while the angular couplings are usually of slightly greater external diameter than the adjacent straight run sections. In this disclosure, the phrase "tube turn" refers generically to any such angular change of direction between pipes or between tubes regardless of the specific interconnections constituting such angular change of direction.

According to the principles of my invention, the hollow, semi-cylindrical sections 3 are cut in such a manner that a plurality of small sections are made, which, when joined together, accurately follow the contour of such a turn. In FIG. 1, a 90° pipe or tube turn, for example, is shown to be housed by a plurality of semi-cylindrical sections 2, such that, when placed around the 90° pipe turn, accurate joints are made so that the straight runs of insulation sections 3 are ultimately precisely joined or interconnected. In cutting such sections 2, the angle between the cut faces of each section conforms to the angle 2A; if 9 sections are used to complete the 90° turn, angle $2A = 10°$ and angle $A = 5°$. These sections may be accurately cut by laying out beforehand the type of turn and the size of insulation on a piece of paper, so that the size and angular cuts to be made on the semi-cylindrical section 3 may be taken off the diagrammatic representation and scribed on the sections 3. In this way, each section 2 may be handmade so that the sections, when combined, will conform precisely to the degree of turn in the pipe. However, when the thickness of insulation is altered, the entire procedure must again be repeated; likewise, when a different size of pipe is encountered in a pipe or tube system, the entire procedure must also again be repeated.

In the present arrangement, a key template is formed which is used in precisely cutting the maximum thickness of insulation section ordinarily to be encountered on a pipe of specific diameter. Thus, each template T is in effect formed so that its edge E and a projection F, attached thereto, form an angle therebetween equal to the angle COD, or angle 2A. The template may be used in setting up a pair of band saw jigs, and all the like thicknesses of insulation may be cut into small segmental sections to cover the pipe 1 of specific diameter. It is immaterial what type of turn is encountered; a 45° turn, a 90° turn, and a 360° turn can all be accurately covered with these sections; the only difference lies in the fact that a greater degree turn will use more sections 2 while a lesser degree turn will use a fewer number of sections 2. Thus, a plurality of templates are made for the maximum thickness of insulation, ordinarily to be encountered, for a plurality of specific diameters of standard pipes or tubes.

To allow these templates to be used where a lesser thickness of insulation is used, a plurality of compensating blocks are provided thereby allowing turns of pipe of a specific diameter to be housed by a wide variety of insulation sections of varying thickness. In this way, the possible combinations available are the product of the number of templates and the number of compensating blocks provided with each template, which blocks are interchangeable amongst the templates.

Referring again to FIG. 1, with the template T formed in the particular manner described, it is seen that the angular thickness is provided for by the fixed distance between edge E and projection F. Thus, if no compensating blocks were to be used, insulation sections of a thickness (or outer diameter), less than maximum, would be cut according to the maximum angular thickness. With the use of a proper compensating block, the effect produced is to adjust the center line of an insulation section, of a thickness less than maximum, to the center line of the tube turn or, also, the center line of the insulation section of maximum thickness. Thus, with insulation sections, of a thickness less than maximum, edge E and projection F provide for the proper angular cut and maximum thickness while the compensating blocks adjust for difference between maximum thickness and the thickness of the particular insulation section.

The template T (FIG. 2) comprises a flat sheet, made of plywood, metal, or similar materials and approximately rectangular in shape, having an extended edge 4 and an edge 5 at an angle A from the normal to edge 4; thus, edge 5 forms an acute angle with edge 4 of 90° minus angle A. Edge 6, opposite edge 4, is made parallel to edge 4, and edge 7 is approximately at right angles to each of the edges 4 and 6. A pair of sheet metal sub-templates 12 are mated with the opposing planar faces of template T; the sub-templates are allochiral and are secured together by a band 15 to maintain the sub-templates in alignment. Each sub-template has a planar face 13 approximately of rectangular form and a right angle flange 14 extending therefrom; the flange is positioned relative to edge 5 so that the angle between the flange and edge 5 is equal to 2A degrees or the plane of flange 14 makes an angle of 90° minus angle A with edge 4 or 6. Relative to FIG. 1, edge 5 corresponds to edge E of the template while flange 14 corresponds to projection F. The angular position of the sub-template relative to the template T is fixed by having a plurality of slots 8, 9, 10, 11 in the body of template T superimposed by a plurality of slots 17, 18, 19, 20 in each face 13; each pair of mated slots is positioned such that the slots are at right angles to each other; thus, for example, slot 8 in template T is at right angles to slot 17 in face 13. Positioning or adjusting of one flange or face 14 also positions opposite flange 14 on the opposite side of the template T, so that when one of the flanges 14 is properly positioned the entire sub-assembly may be locked to the body of template T by a plurality of bolts and nuts 21a (only one of which is shown in FIG. 2).

A plurality of such templates are provided, with each template corresponding to a definite pipe size. The only difference between templates is the change in angle A. In theory, only one template is required having an angle 2A of only a few degrees, say 2°. Thus, regardless of the pipe diameter, 45 sections would be cut to cover a 90° tube turn. However, this number of sections becomes unwieldly and unnecessary, as such accuracy is not required. From experience, it has been determined that satisfactory insulation coverings for tube turns of smaller diameter pipes or tubes can be made from only a relatively few sections, while for the larger diameter pipe, a somewhat greater number of sections must be utilized to produce a satisfactory insulation covering. As a result, templates are formed having angles A conforming to the following pipe sizes:

| Pipe size: | Angle A |
|---|---|
| 3″ | 11¼° |
| 4—5—6″ | 7½° |
| 8–10″ | 5⅝° |
| 12–14″ | 4½° |
| 16–18″ | 3¾° |

With such a compromise, it is evident that some of the tube turn angles are not provided for, especially in the smaller pipe sizes. However, from a practical viewpoint, the odd angles, say 89° for example, are seldom encountered, and consequently these odd angles do not present many problems. Usually, if such an odd angle is encountered, it suffices to cut one of the sections 2 in half or in thirds, and this smaller section is added to the sections previously added to the turn thereby to complete the odd-angled tube turn.

The templates are used with a modified conventional band saw 21 (FIG. 3), adjacent to which is a platform having a plurality of upright legs 23 secured to any conventional base (not shown). A plurality of transverse L-shaped brackets 24 are secured to members 23 by a plurality of nuts and bolts 28 (FIGS. 3 and 5); the relative height of each corner of each bracket is adjustable by structure comprising a lug 31 secured to bracket 24, lug 30 secured to an adjacent leg member 23, and an adjustment bolt 29 loosely and rotatably attached to lug 31 and in screw threaded relationship with lug 30. Thus, when an adjustment is necessary, nut and bolt 28 and lock nut 29a are loosened and bolt 29 is rotated to provide a lowering or a raising of the adjacent end of bracket 24, after which, bracket 24 is resecured to member 23 by retightening of lock nut 29a and nut and bolt 28.

Welded to the cross members 24 are a pair of guide rail supports 25 on which are superimposed a pair of hexagonal rails 26; rollers 27 (FIG. 4) ride on these rails and support carriage 34. The rollers are rotatably secured in pairs, as by ball bearings, to the carriage by spindles 32 supported in pillow boxes 33 secured to the underside of the frame. The frame 23 is of rectangular form and has a handle 35 at one edge so that the carriage can be pushed or pulled along the rails 26 via the rotating rollers 27. A plurality of stops 36 secured to the edges of the carriage properly position thereon the band saw table 38.

The table (FIGS. 8 and 9) comprises a rectangular sheet of plywood 39, or other equivalent material, contained in a rectangular frame 40. Extending along almost the entire length of the table is an insert 41 having a slot 42 in which the band saw blade 43 rides.

Slots 44, cut in the table parallel to slot 42, have positioned therein miter gauges 45 on opposite sides of the table. Each miter gauge comprises an L-shaped bracket 46, one leg face of which has secured thereto positioning block 47 and the other leg face of which rides on the upper surface of the table. Locking apparatus 48, positioned within each miter gauge and extending into slots 44, lock each gauge at a particular adjustment. When the table is properly superimposed upon the carriage, that is to say, when guides 36 are properly abutted by adjacent sides 40 and saw blade 43 freely moves in slot 42, holes are drilled in the table and carriage, and fastening means, such as conventional nuts and bolts, are passed therethrough to secure the table and carriage to each other.

Holes 52 are drilled on one side of slot 42 and superposed thereover are limiters 53. Each limiter (FIG. 6) comprises an L-shaped frame having legs 54, 55; the limiter is also of approximately rectangular form and has an edge face 56 cut at a diagonal to one corner of the entire bracket for purposes of simplification and to prevent engagement between a corner of the limiter and the saw blade. Slot 57 extends inwardly from one edge of leg 54 and is adapted to be superimposed over one of the holes 52; the slot allows the limiter 53 to be easily repositioned to conform to the angles 2A of a particular group of sections. After positioning of the limiter in a manner hereinafter explained, nut and bolt 58a, extending through slot 57 and hole 52, securely mate the limiter to the table 38.

A plurality of compensating blocks 58 (FIG. 7) are provided to be used with each of the templates to compensate for insulations of a thickness smaller than that provided for by the template T. Each block has a pair of hanger bolts 59 extended at right angles thereto, which bolts are placed in slots 60 of positioning block 47 when the compensating block is in use; nuts 61 secure the blocks to each other. Since two miter gauges are provided, the compensating blocks are provided in pairs. The thicknesses provided for vary in ½" increments; thus, the sizes of the blocks are ½", 1", 1½", 2", 2½", and 3". The thickness and number of such blocks may be varied, however, depending upon the particular standard line of insulation sections of a particular manufacturer.

In the operation of the system, the carriage 34 (FIG. 3) is positioned adjacent band saw 21 with rollers 27 riding upon guide rails 26. Table 38 is superimposed upon the carriage and abutted against stops 36 so that its slot 42 is properly aligned with the band saw blade 43. Fasteners 48 in each of the miter gauges and fasteners 58a in each of the stops or limiters 53 are loosened, and a template is positioned within the slot 42 such that one of the faces 14 of the template T rides in the slot (upper half of FIG. 8). With this positioning, edge 6 is adjacent positioning block 47 of the gauge 45 and edge 5 is adjacent leg 55 of the limiter 53; the block 47 and the leg 55 are manipulated until they properly mate with the edges 6 and 5, and their relative positions are secured by the retightening of locking means 48 and 58a. The template is removed from the slot 42, reversed, and reinserted in slot 42 on the opposite side of blade 43, but now with the opposing face 14 in the slot. The template is placed against the opposing miter gauge 45 and its adjacent stop 53. Block 47 and leg 55 are properly positioned relative to the cutting blade, i.e., by properly mating with edges 6 and 5 of the template, and their positions, relative to the cutting blade, are secured by retightening of locking means 48, 58a as before. It is evident that definite angular relationship exists between the various components. Thus, planes passed through blade 43, faces 55 and the longitudinal axis of blocks 47, form a pair of planar isosceles triangles having the plane of blade 43 as a common base.

The table and band saw are now in position to properly cut a plurality of sections for the maximum size of thickness of insulation from a standard length of hollow, semicylindrical insulation section. Thus, if the template for the 3" pipe has been selected to position the gauge and stops, the angle is 22½° or equal to 2A°. On the table, this angle appears between the forward face of leg 55 of limiter 53 and the plane of the cutting blade 43. If the thickness required is of the maximum size, semi-cylindrical insulation section 3 is placed against block 47 of one of the miter gauges and a cut is made by the blade to obtain a properly angled starting edge. The section 3 is now alternately positioned between each of the adjacent pairs of gauges 45 and limiters 53 so that the long edge of the section, i.e., the edge parallel to the axis of the central opening, abuts block 47 and the short edge, i.e. the edge at an acute angle to the axis of the pipe opening, abuts leg 55 (lower half of FIG. 8). With each positioning, the table is moved on its rollers to position properly the section 3 relative to the cutting blade and a cut is made by the saw blade. The repositioning and cutting operations are continued until the desired number of sections is produced. The sections are then assembled around a turn as, for example, shown in FIG. 1 and secured in place by conventional means, i.e., a plurality of bands, wire and/or by cementing.

In the event that the thickness of insulation desired is other than the maximum, a compensating block is used with each of the blocks 47. Referring to the lower half of FIG. 8, it is seen that if an insulation section 3, of a thickness less than maximum, were to be placed against block 47, the axis of the central opening would be closer to the block 47. Consequently, a subsequent cut made by the blade 43 would produce a section 2 having the proper angle between the faces but which would have an improper angular thickness. With the use of compensating blocks, the central axes of the openings for different thicknesses of insulation sections 3, which are to be cut according to a particular template adjustment, are superposed upon each other. Thus, the proper compensating block 58 is selected and secured to each of the blocks 47 so that hanger bolts 49 properly mate in slots 60, and the two are secured together by the tightening of nuts 61. The sequential cutting operation is performed in a manner similar to that described above, except that the hollow, semi-cylindrical section 3 is placed against the compensating block 58 rather than against the positioning block 47.

From the above description, it is evident that one adjustment of miter gauges 45 and limiters 53 is all that is required for all pipe or tube turns of a particular diameter, as the angle 2A is constant for this particular diameter of pipe. Consequently, in insulating a complete installation, all tube turns having similar diameters are calculated for the entire installation. The total number of degree turns and sections 2 are then calculated for the proper insulation thicknesses. If, for example, the thicknesses are to be of one size, then all the sections 2 are cut for the entire installation at one time using the proper compensating blocks, if any. If the thicknesses vary, then all sections 2 for one pipe diameter and of the same thickness are cut for the entire installation; if necessary, a compensating block is used, as described. The adjustment of gauge 45 and limiter 53 is maintained, and a new compensating block is placed against and secured to positioning block 47. All sections 2 for this particular pipe diameter, but of a different thickness of insulation, are then subsequently formed, as described.

The miter gauges and limiters are readjusted for another pipe size calculated in the same manner as to total number of degree turns and insulation thickness required, and the sections 2 are cut for this particular pipe size. This operation is repeated until all the sections 2 have been precut for the entire piping system. The precut sections 2 are taken to the job site and assembled around the tube turns as noted.

Having thus described the invention in rather full detail, it will be understood that these details need not be strictly adhered to and that various changes and modifications may suggest themselves to one skilled in the art, all falling within the scope of the invention as defined by the subjoined claims.

What I claim is:

1. A system for cutting insulation sections for tube turns from a standard semi-cylindrical insulation section comprising a saw blade, a table mounted adjacent the blade for movement past the cutting edge of the blade, a slot in the table in which the blade is mounted allowing movement of the table past the blade, adjustable positioning means on the table, and a template having a projection to be inserted in the slot and with which the positioning means is mated thereby to locate the positioning means at a predetermined angle relative to the cutting blade.

2. The system of claim 1, further including adjustable limit means mounted on the table adjacent the positioning means, and an additional projection on said template cooperating with the limit means when said first projection is positioned within said slot thereby locating the limit means at a predetermined distance and angle relative to the blade.

3. The system of claim 1, further including compensating block means mated with the positioning means.

4. In a fabrication system for cutting insulation sections for covering pipe turns comprising a table having a work surface and being mounted for movement past a cutting blade lying in a plane transverse to said work surface, first positioning means on the table having a positioning face locked at a predetermined angle with the plane of the blade, second positioning means on the table having a positioning face locked at the same predetermined angle with the plane of the blade, both positioning means being positioned on the same side of said plane such that imaginary lines passed through the plane of the blade and the planes of the positioning faces form an isosceles triangle, first limiting means on the table adjacent the first positioning means, second limiting means on the table adjacent the second positioning means, both limiting means being located on the side of the plane of the cutting blade opposite the positioning means, and each of said limiting means having a planar face making an angle with the plane of the blade of double the difference of 90° and the predetermined angle.

5. In a method for pre-cutting insulation sections for a tube turn on a band saw, comprising dividing the tube turn into a plurality of equi-angular sections, forming a template having a pair of faces related to each other so that the angle between the faces is equal to the section angle, and adjusting a band saw having a stop with a limiting face thereon using the template so that the saw blade of the band saw is parallel to one of the faces of the template and the limiting face is parallel to the other template face.

6. In a method for pre-cutting insulation sections for a tube turn on a band saw from standard, hollow, semi-cylindrical sections comprising dividing the tube turn into a plurality of equi-angular sections, forming a template with a pair of faces related to each other so that the angle between the faces is equal to the section angle and an additional face at an angle to one of the faces of 90° minus the section angle, adjusting a gauge on one side of the band saw blade and limiter on the opposite side of the band saw blade by the use of the template so that the gauge is at an angle of 90° minus the section angle relative to the plane of the blade and the limiter is at an angle of twice the section angle relative to the plane of the blade.

7. In the method as recited in claim 6, additionally the steps of removing the template from the band saw, and positioning a standard, hollow, semi-cylindrical section adjacent the blade so that one edge of the semi-cylindrical section is against the gauge and an adjacent edge is against the limiter.

8. In a fabrication system for cutting semi-cylindrical insulation sections for covering pipe turns comprising a table mounted for movement past the cutting blade, first positioning means having a positioning face thereon, second positioning means having a positioning face thereon, a slot in the table in which the blade is mounted allowing movement of the table past the blade, a template having a pair of projections to be inserted alternately in the slot to position the template, said first positioning means having its positioning face positioned by the template when the latter has one of its projections in the slot, and said second positioning means having its positioning face positioned by the template when the latter has the other of its projections in the slot.

9. The fabrication system of claim 8, further including limiting means located on said table against each of the positioning means, each of said limiting means being also positioned by the template when the template is in a position to locate the adjacent positioning means.

References Cited in the file of this patent

UNITED STATES PATENTS

| | | |
|---|---|---|
| 633,362 | Maidhof | Sept. 19, 1899 |
| 729,915 | Beecher | June 2, 1903 |
| 1,048,319 | Knights | Dec. 24, 1912 |
| 1,644,624 | Anderson | Oct. 4, 1927 |
| 1,749,980 | Loesser | Mar. 11, 1930 |
| 2,476,292 | Guay | July 19, 1949 |
| 2,601,878 | Anderson | July 1, 1952 |
| 2,789,596 | Barnes | Apr. 23, 1957 |
| 2,835,288 | Jones | May 20, 1958 |
| 2,856,972 | Bruch | Oct. 21, 1958 |